United States Patent [19]

Petronelli

[11] Patent Number: 4,582,265

[45] Date of Patent: Apr. 15, 1986

[54] GARLIC CRUSHER AND/OR MINCER

[76] Inventor: Claudio Petronelli, 192 Victoria Ave., Wanganui, New Zealand

[21] Appl. No.: 665,541

[22] Filed: Oct. 26, 1984

[30] Foreign Application Priority Data

Nov. 4, 1983 [NZ] New Zealand .................. 206154

[51] Int. Cl.[4] .................... A47J 42/34; B23B 9/02
[52] U.S. Cl. .................... 241/95; 30/120.3; 99/495; 100/234
[58] Field of Search ............... 30/120.3, 120.4, 120.5; 241/DIG. 27, 169, 169.1, 169.2, 95; 100/234; 99/495

[56] References Cited

U.S. PATENT DOCUMENTS

| 487,339 | 12/1892 | Webb | 241/95 |
| 1,219,830 | 3/1917 | Marsh | 30/120.3 |
| 1,219,859 | 3/1917 | Paxton | 30/120.3 |
| 1,399,708 | 12/1921 | Ferdon | 241/169 |
| 1,712,802 | 5/1929 | Willis | 241/DIG. 27 |
| 2,776,616 | 1/1957 | Sarossy | 100/234 |
| 2,804,111 | 8/1957 | Buchett | 30/120.3 |
| 3,583,454 | 6/1971 | Borner | 241/95 |
| 4,069,752 | 1/1978 | Ahner | 100/234 |
| 4,311,283 | 1/1982 | Bounds | 241/95 |
| 4,348,950 | 9/1982 | Harris | 99/495 |
| 4,366,930 | 1/1983 | Trombetti | 241/169 |

FOREIGN PATENT DOCUMENTS

| 965086 | 9/1950 | France . |
| 1036970 | 9/1953 | France . |
| 1051249 | 1/1954 | France . |
| 1052074 | 1/1954 | France . |
| 1570139 | 6/1969 | France . |

Primary Examiner—Jimmy C. Peters
Attorney, Agent, or Firm—Stevens, Davis, Miller & Mosher

[57] ABSTRACT

The invention consists in a device for crushing or mincing garlic or other things. The device has an open topped receptacle formed with sides and a perforated bottom. A plunger fits within but is removable from the receptacle to allow garlic to be placed within it. A forcing means is provided to enable the plunger to be forced towards the bottom of the receptacle thereby crushing the garlic. Rotating means enables the plunger to be rotated to assist in breaking up the garlic. The preferred embodiment has two pivotally attached elongated members, one supporting the receptacle and the other a forcing member to which the plunger is rotatably attached. The elongated members also provide handles.

7 Claims, 5 Drawing Figures

GARLIC CRUSHER AND/OR MINCER

BACKGROUND OF THE INVENTION

This invention relates to a garlic crusher and/or mincer. However, while garlic is referred to in the title of the invention and throughout the specification this refers only to the preferred use of the invention. Other things such as ginger and peppercorns for example, may be crushed and/or minced by the garlic crusher and/or mincer of the present invention.

One problem with existing garlic crushers when used for crushing garlic is that they generally work simply by compressing the cloves of garlic between two surfaces. This does, to a degree, crush the garlic cloves but is not particularly effective in causing the cloves to disintegrate and allowing the juice to be extracted unless large forces are applied. It was with problems such as this in mind that the present invention was devised.

SUMMARY OF THE INVENTION

The present invention broadly consists in a garlic crusher and/or mincer comprising:
a receptacle having an open top, sides, and a bottom which is perforated;
a plunger which fits within but which is removable from the receptacle;
forcing means which, in use, forces the plunger towards the bottom of the receptacle; and
rotating means which, independently of the forcing means, enables the rotation of the plunger within the receptacle.

Preferably the receptacle is supported by a first elongated member which provides a pivot means to one side of the receptacle and a handle to an opposite side of the receptacle.

Preferably the receptacle is an integral part of the first elongated member.

Preferably the garlic crusher and/or mincer forcing means includes a forcing member which is supported by a second elongated member which provides a pivot means to one side of the forcing member and a handle to an opposite side of the forcing member.

Preferably the forcing member is an integral part of the second elongated member.

Preferably the first and second members are pivotally connected together at their respective pivot means and they are capable of being pivotally moved relative to each other from an open position, where the open top to the receptacle is exposed, to a closed position where the forcing member and the handle of the first member are superimposed over the receptacle and the handle of the second member respectively, the forcing member then being located over the open top of the recep- tacle.

Preferably the plunger is rotatably attached to the forcing member such that when the first and second members are in an open position, the plunger is clear of the receptacle but as the first and second members are pivoted together the plunger enters the receptacle.

Preferably there is a third handle on the side of the forcing member opposite the plunger which, when rotated, causes the plunger to rotate.

Preferably the plunger has a corrugated bottom.

BRIEF DESCRIPTION OF THE DRAWINGS

The above gives a broad description of the present invention, a preferred form of which will now be described with reference to the accompanying drawings in which.

DETAILED DESCRIPTION OF THE INVENTION

Figure 1:
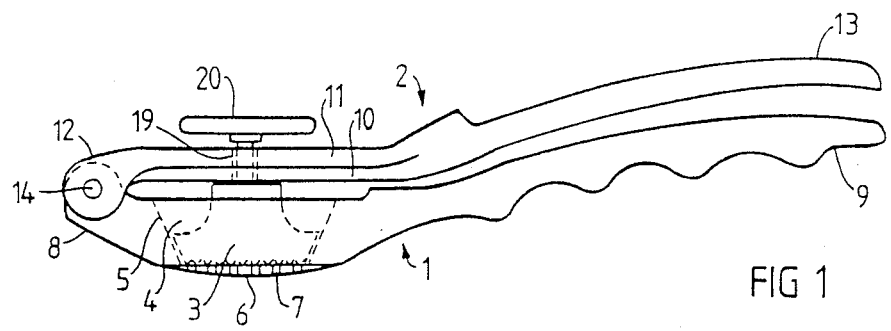
FIG. 1 shows a side view of the garlic crusher and/or mincer in the closed position.

The garlic crusher and/or mincer of the present invention is designed particularly to have its components formed by moulding of suitable plastics materials or casting of suitable metals. However, the garlic crusher and/or mincer can be formed by other known fabrication techniques or materials or combinations of materials.

The preferred garlic crusher and/or mincer comprises basically three main components, these being a first elongated member 1, a second elongated member 2 and a plunger 3. The first and second elongated members are preferably moulded or cast as unitary pieces although this is not an essential aspect of the invention.

The first elongated member supports a receptacle 4 having an open top, sides 5 and a bottom 6 which is perforated, preferably by a plurality of holes 7. The receptacle preferably has the shape of a truncated cone so that its sides 5 taper inwardly towards the bottom. The first elongated member provides a pivot means 8 to one side of the receptacle and a handle 9 to an opposite side of the receptacle. The underside of this handle may be provided with finger grips.

The second elongated member supports a forcing member 10 of a generally circular disc shape but preferably reinforced, for example, by ribs 11 across its top surface. The second elongated member provides a pivot means 12 to one side of the forcing member and a handle 13 to an opposite side of the forcing member.

Figure 3:
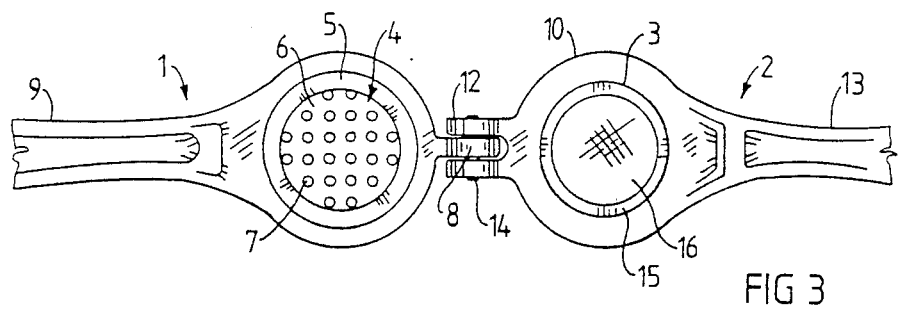
FIG. 3 shows a plan view from above of part of the garlic crusher and/or mincer in an open position.
Figure 2:
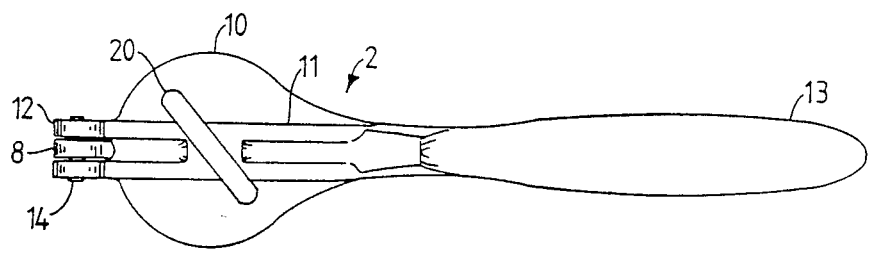
FIG. 2 shows a plan view from above of the garlic crusher and/or mincer in its closed position.

The first and second members are pivotally connected together at their respective pivot means by a pivot pin 14. This enables the first and second members to be pivotally moved relative to each other from an open position, or rather a variety of open positions where the open top to the receptacle is exposed, to a closed position. One open position is shown in FIG. 3 where the first and second members have been opened to lie at 180° relative to each other. In the closed position the forcing member 10 and the handle 13 of the second member 2 are superimposed over the receptacle 4 and the handle 9 of the first member 1 respectively, the forcing member then being located over the open top of the receptacle. This is shown in FIGS. 1 and 2.

Figure 4:
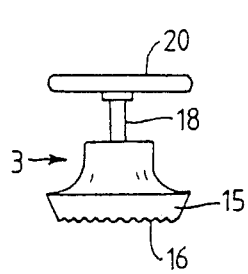
FIG. 4 shows a side view of the plunger.

The plunger 3 which is shown separated from the rest of the garlic crusher in FIG. 4 is rotatably attached to the forcing member 10 such that when the first and second members are in an open position the plunger is clear of the receptacle. This allows cloves of garlic or other things to be placed in the receptacle for crushing and/or mincing. As the first and second elongated members are brought together the plunger enters the receptacle and as the handles 10 and 13 are squeezed further together the plunger crushes the garlic in the receptacle. The first and second elongated members are preferably designed so that when they are brought together to their closed position their handles are not brought completely together, a gap being left between them to prevent the skin of the hand of a user from being pinched between the handles.

Figure 5:
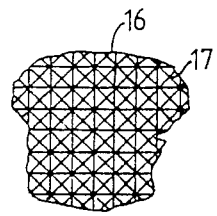
FIG. 5 shows a detail of part of the bottom of the plunger.

The plunger as shown has a body, the lower portion 15 of which is shaped to correspond generally with the shape of the bottom portion of the receptacle, the dimensions of the lower portion 15 being slightly reduced from this however. The bottom surface 16 of the plunger is preferably corrugated or grooved, and preferably corrugated or grooved in two directions at right angles so that a plurality of points 17 is provided as shown in FIG. 5. This configuration assists in the crushing and the disintegration of the thing being crushed, especially when the plunger is rotated within the receptacle while pressure is being applied to the plunger by the handles 10 and 13 being squeezed together. From the upper portion of the body of the plunger a shaft 18 projects and passes through a hole 19 in the forcing member. A third handle 20 is attached to the shaft on the side of the forcing member opposite the plunger. This handle 20 enables the plunger to be rotated independently of the forcing means. In use, when pressure is being applied, rotation of the plunger causes a shearing action between the bottom of the plunger and the bottom of the receptacle. The top and bottom surfaces of the thing being crushed tend to be gripped by the corrugations on the bottom of the plunger and by the sides of the holes on the bottom of the receptacle respectively. This assists the shearing action. The holes of course also allow the juice, if any, from the thing being crushed to pass through. If the handle 20 is made to be detachable from the plunger, the plunger can be separated from the forcing member for more effective cleaning.

The above describes the preferred form of the invention and indicates some possible modifications. However, various other modifications may be made without departing from the scope of the invention as has been broadly defined in the claims. The preferred form of the invention operates in a manner similar to that of a conventional type of nutcracker, pressure from the hand of the user applied to the handles being transmitted to the plunger to provide the crushing force. However, this crushing force may be provided by other means. For example, the receptacle may be provided with an internally threaded upper portion into which a plug supporting the rotatable plunger is screwed. By screwing the plug down towards the bottom of the receptacle, force can be applied to anything between the plunger and the bottom of the receptacle and the plunger can still be rotated independently of this form of forcing means.

The form of the invention so far described is operated manually, the crushing force being applied by one hand of the user and the rotation of the plunger being effected by the other hand of the user. However, for large scale operations, the crusher may be automated, for example, movement of the plunger towards and away from the bottom of the receptacle can be controlled by hydraulic or pneumatic means and an electric motor used to rotate the plunger when desired. Microswitches and electronic control means could be used to programme the sequence of operations of the crusher. The bottom of the crusher in any form of the invention may be made to be detachable for cleaning purposes.

What is claimed is:

1. A garlic crushing and/or mincing device comprising:
   first and second elongated members, each being molded from a rigid material and having an end shaped to form a handle and an opposite end pivotally attached to the other elongated member, the second member being pivotable in a plane to a closed position overlying the first member which has an opentopped receptacle having sides tapering inwardly towards a substantially flat, perforated bottom integrally molded in it between its pivot end and its handle, the second member having a forcing member integrally formed between its pivot end and its handle and shaped to superimpose over the opening to the receptacle when the second member is in its closed position; and a plunger rotatably mounted to the underside of the forcing member and shaped to fit closely within the receptacle adjacent its bottom when the second member is in its closed position but being removable clear of the receptacle when the handles of the elongated members are moved sufficiently apart, the plunger being fixed to a shaft which passes through a hole in the forcing member and has a handle at its end on the upper side of the forcing member, any rotation of this handle causing rotation of the plunger.

2. A device as claimed in claim 1 wherein the handle of the first member has fingergrips formed on it.

3. A device as claimed in claim 1 wherein the bottom of the receptacle is perforated with an array of holes each of which is sufficiently small to prevent the bulk of the solid material being crushed and/or minced from passing through.

4. A device as claimed in claim 3 wherein the holes are shaped to provide gripping means which act to grip the solid material which lies against the bottom of the receptacle, when the solid material is compressed against the bottom by the plunger.

5. A device as claimed in claim 4 wherein the plunger is molded from a rigid material and has other gripping means formed in it.

6. A device as claimed in claim 5 wherein the other gripping means conprises a plurality of sharpened projections.

7. A device as claimed in claim 6 wherein the sharpened projections are pyramidal in shape.

* * * * *